United States Patent [19]
Mizokami

[11] 4,343,541
[45] Aug. 10, 1982

[54] REFLECTION PHOTOMETRIC APPARATUS FOR CAMERA INCLUDING FOCAL PLANE SHUTTER

[75] Inventor: Kazunori Mizokami, Hachioji, Japan

[73] Assignee: Olympus Optical Co., Ltd., Japan

[21] Appl. No.: 170,514

[22] Filed: Jul. 21, 1980

[30] Foreign Application Priority Data

Sep. 17, 1979 [JP] Japan .................................. 54-119644
Oct. 17, 1979 [JP] Japan .................................. 54-133992

[51] Int. Cl.$^3$ .............................................. G03B 7/081
[52] U.S. Cl. ....................................... 354/51; 354/60 R
[58] Field of Search .................. 354/50, 51, 60 R, 29, 354/30, 36, 38; 250/214 R, 214 P, 214 C; 307/311, 352, 353; 328/151, 162, 165; 356/215, 218, 226

[56] References Cited

U.S. PATENT DOCUMENTS 3,994,001 11/1976 Maitani et al. .................. 354/51
4,159,870 7/1979 Corey et al. ................... 354/51 X Primary Examiner—L. T. Hix
Assistant Examiner—William B. Perkey
Attorney, Agent, or Firm—Ostrolenk, Faber, Gerb & Soffen

[57] ABSTRACT

A reflection photometric apparatus for camera including focal plane shutter includes a photoelectric transducer element which determines reflected light from a first blind surface of a shutter and a film surface. A sample-and-hold circuit maintains an integrated voltage which is formed by an integration of a photometric output from the transducer element, and a summing amplifier circuit appropriately corrects the integrated voltage.

17 Claims, 9 Drawing Figures

REFLECTION PHOTOMETRIC APPARATUS FOR CAMERA INCLUDING FOCAL PLANE SHUTTER

BACKGROUND OF THE INVENTION

The invention relates to a reflection photometric apparatus for a camera including a focal plane shutter, and more particularly, to such apparatus in which a proper exposure period is automatically determined by the photometry (measurement) of light from an object being photographed which is reflected from either one or both of a shutter blind surface and a film surface.

Since the purpose of a photometric apparatus used in a camera is to determine the amount of light reflected from an object being photographed in order to assure a proper exposure onto a film, it is desirable to effect photometry by disposing a photometric, photoelectric transducer element on a location which is ideally on a film surface, or on an equivalent surface, for example, on a shutter blind surface of a focal plane shutter. However, this is impossible in practice, and the usual practice is to employ a so-called direct photometry system in which light from an object being photographed which is reflected by a film surface or its equivalent shutter blind surface is determined. As is well recognized, when a blind shutter of the focal plane type is used, the film surface is initially covered by a first shutter blind which is formed by a black cloth. As the first blind begins to run is response to a shutter release operation, the film surface begins to be exposed in accordance with the movement of the blind across the picture frame. After a given time interval has passed which corresponds to a proper exposure period, a second shutter blind which is again formed by a black cloth is allowed to run, again covering the exposed film surface.

It will also be noted that for a high speed shutter operation, the second blind is allowed to run during the time the first shutter blind continues to run so that a reduced exposure period can be obtained. It will be understood that as the exposure period is reduced, the width of a slit formed between the first and the second shutter blind also decreases.

When the timing of a proper exposure is determined by the photometry of light from an object being photographed which is reflected by the first shutter blind and the film surface, which are interrelated as mentioned above, the reflected light from the first shutter blind is initially determined, followed by the determination of reflected light from the film surface being exposed. In this instance, since the blind surface and the film surface have substantially different optical reflectivities, some compensation must be made. Specifically, if the reflectivity of the first blind surface is different from that of the film surface, the photometric value which is obtained by the photometry of respective reflected light will be calculated at different rates, preventing a proper exposure from being achieved.

For this reason, in a conventional photometric apparatus of this kind, a material which exhibits the same reflectivity as the film surface has been printed on the first shutter blind in a pattern in order to achieve the same reflectivity for both the first shutter blind surface and the film surface. However, a shutter blind comprises a cloth located on the front side and which is lined with rubber fabric on the rear side, and therefore it is very difficult to work the front side as by printing, resulting in a very expensive structure. In addition, the arrangement suffers from difficulties that a change in the reflectivity occurs if the printed pattern varies from blind to blind and that the printed pattern may be exfoliated and the planarity of the blind surface may be degraded since the shutter blind is wound up by a rapid operation. Furthermore, the printing of reflecting patterns on the first shutter blind may interfere with a dimming effect of black delustering paints which are provided on the internal surfaces of the camera in order to reduce stray light within mirror box, leakage of light onto the film or to prevent ghost or flare. Thus, the printing may result in the occurrence of flare or ghost.

To eliminate such disadvantages, there is proposed an arrangement in which a non-worked, black first shutter blind is directly used without a pattern printing, and a proper exposure is achieved by compensating for differential optical reflectivities of the first shutter blind and the film surface.

FIG. 1 illustrates how a film surface which has been covered by a first shutter blind begins to be exposed as the first blind runs. In FIG. 1, a rectangular frame F represents a picture frame associated with the film, and as the first shutter blind B moves in a direction indicated by an arrow $a_0$, a film surface E which has been initially covered by the first blind begins to be exposed in a sequential manner. The abscissa represents time t. Specifically, when the first blind B leaves the left-hand edge of the frame F at time $t=T_1$, the exposure of the film surface E is initiated. At time $t=T_2$, the first blind B passes through the right-hand edge of the picture frame F, fully exposing the picture frame. In FIG. 1, the first blind B has partially exposed the film surface E. Representing the exposed area of the film surface E by $A_2$, and the area thereof which is still covered by the first blind B by $A_1$, the total area $A_0$ of the picture frame F is equal to the sum of $A_1$ and $A_2$. The time variation of these areas is illustrated in FIG. 2. Thus for $t<T_1$, the exposed surface areas $A_2$ of the film surface E remains zero while the area $A_1$ is equal to the total area $A_0$ of the picture frame F which is entirely covered by the first blind B. When the time t is between the times $T_1$ and $T_2$, the exposed area $A_2$ of the film surface E increases with time t while the area $A_1$ of the film surface E which is covered by the first blind B decreases with time t. However, the sum of $A_1$ and $A_2$ remains equal to the total area $A_0$. For $t>T_2$, the area $A_2$ of the film surface E is equal to the total area $A_0$ while the area $A_1$ of the film surface E which is covered by the first blind B is zero.

In a method of achieving a proper exposure by the photometry of reflected light from the first shutter blind and the film surface, one of which is moving relative to the other and having varying areas, the first blind should ideally be removed so that the photometry is made only for the reflected light from the film surface. However, as a matter of practice, there exists the first blind, and hence by determining the reflected light from the first blind surface, a difference cover the reflected light from the film surface is calculated to compensate for the difference, thereby enabling a proper exposure.

When determining the reflected light from the first shutter blind surface and the film surface, a photoelectric transducer element such as silicon photodiode is usually used to convert the light input into a corresponding photocurrent, which then charges a capacitor to develop an integrated voltage thereacross. The integrated voltage is compared against a given decision level, thereby determining a proper exposure period.

FIG. 3 graphically illustrates an exemplary photocurrent $I_P$ taken on the ordinate and plotted over the time t on the abscissa. As will be seen, if the first shutter blind surface has the same reflectivity as the film surface, the photocurrent will not change over time or as the first blind moves, providing a constant photocurrent $I_F$ which corresponds to the reflectivity of the film surface. However, when the first shutter blind surface has a different reflectivity from the film surface, the photocurrent $I_P$ will change with the movement of the first blind. In FIG. 3, times $T_1$, $T_2$ represent the times corresponding to those times shown in FIG. 1. Thus, the exposure of the film surface is initiated at time $T_1$ and the first blind has fully exposed the picture frame at time $T_2$. An intermediate time when the first blind is moving across the film surface is designated by $T_C$. The photocurrent $I_S$ shown on the ordinate represents a photocurrent which results from the reflected light from a black first shutter blind surface which is not provided with a printed pattern. The photocurrent $I_F$ represents a photocurrent which results from the reflected light from the film surface.

In FIG. 3, curves $I_A$, $I_{AR}$ and $I_B$ represent varying photocurrents which result from reflected light from a black first blind surface which is not provided with the printed pattern. Specifically, the curve $I_A$ depicts a varying photocurrent when the photometry is effected with a photoelectric transducer element having a center concentrated orientation characteristic. Thus, until time $T_C$ when the first blind moves past the central region of the film surface, the photocurrent from the transducer element is equal to the photocurrent $I_S$ that is due to the first blind surface while after time $T_C$, it is equal to the photocurrent $I_F$ due to the film surface. It should be noted that the curve $I_A$ is depicted theoretically only, and it will be noted that it sharply rises at right angles at time $T_C$. However, even a transducer element having a center concentrated orientation characteristic has a certain degree of distributed sensitivity about the center, so that the actual change of the photocurrent will be as shown by the curve $I_{AR}$. Thus, although the photocurrent exhibits a point of inflection at time $T_C$, the change is not that of right angles, but occurs gradually around the time $T_C$.

The curve $I_B$ represents a change of a photocurrent which is obtained with a photoelectric transducer element having a uniform orientation characteristic. The photocurrent increases in proportion to the running of the first blind which causes the film surface to be exposed. It will be noted that the curve $I_B$ is similar to the change of the area $A_2$ of the film surface shown in FIG. 2. Thus, the photocurrent is equal to the photocurrent $I_S$ due to the reflection from the first blind surface prior to time $T_1$, and is equal to the photocurrent $I_F$ due to the reflection from the film surface after time $T_2$.

FIG. 4 represents an integrated voltage which is produced by the photocurrent $I_P$. The integrated voltage $V_C$ is shown on the ordinate while the abscissa represents the time t. The straight line $F_V$ represents an ideal integrated voltage, plotted over the time, which results from the reflected light from the blind surface having the same reflectivity as the film surface. By contrast, curves $A_V$, $B_V$ represent the integrated voltages which result from the reflected light from a black first blind surface which is not provided with a printed pattern. These curves correspond to the curves $I_A$, $I_B$ of FIG. 3. Specifically, the curve $A_V$ represents an integrated voltage obtained by the photometry with a photoelectric transducer element having a center concentrated orientation characteristic while the curve $B_V$ represents an integrated voltage obtained by the photometry with a photoelectric transducer element having a uniform orientation characteristic.

Time $T_1$ on the abscissa represents the initiation of exposure of the film surface while time $T_2$ represents the time when the first blind has fully exposed the picture frame. Time $T_3$ indicates the initiation of running of the second blind after a proper exposure has been given. Times $T_{4a}$, $T_{4b}$ represent the times when the integrated voltage which result from the reflected light from the black first blind surface becomes equal to a decision level $V_{COM}$, to be described later, when transducer elements having the center concentrated orientation characteristic and the uniform orientation characteristic, respectively, are used. It is to be noted that time $T_C$ represents the time when the trailing edge of the first blind moves past the center of the film surface. As will be evident, the integrated voltage is compared against the decision level $V_{COM}$, and allows the second shutter blind to start running to close the shutter when the integrated voltage becomes equal to the decision level.

Considering the curve $A_V$ more specifically, it is noted that it presents an integrated voltage which is reduced in comparison to that of the ideal line $F_V$ and presents a substantial time lag with respect thereto. The curve $A_V$ crosses the decision level $V_{COM}$ at point $P_2$ or at time $T_{4a}$, which has a time lag of $T_{4a}$-$T_3$ with respect to the point $P_F$ where the line $F_V$ crosses the decision level $V_{COM}$. The time lag represents an error in the exposure period. The curve $A_V$ has a bend at point $P_1$, and thus it comprises a pair of line segments $P_0$-$P_1$ and $P_1$-$P_2$. The point $P_1$ will be referred to as a break point. Since the curve $A_V$ represents an integration of a photocurrent which is represented by the curve $I_A$, the integrated voltage is linear and low, as indicated by the line segment $P_0$-$P_1$, inasmuch as the associated transducer element receives the reduced reflected light from the first blind surface and provides the photocurrent $I_S$ of FIG. 3 until time $T_C$ when the trailing edge of the first blind has moved past the center of the film. After $T_C$, the transducer element receives the reflected light from the film surface or provides the photocurrent $I_F$, and hence the integrated voltage increases in parallel relationship with the line $F_V$, as indicated by the line segment $P_1$-$P_2$. Thus, the curve $A_V$ comprises the line segment $P_0$-$P_1$ for $0<t<T_C$ and another line segment $P_1$-$P_2$ for time $t>T_C$, which are joined together at the break point $P_1$. On the other hand, the curve $B_V$ exhibits the similar integrated voltage as the curve $A_V$ until point $P_3$ corresponding to time $T_1$, but when the film surface begins to be exposed at time $T_1$, the reflected light increases gradually, and after point $P_4$ corresponding to the time $T_2$ when the picture frame is fully exposed, the reflected light is entirely due to the reflection from the film surface, whereby the curve $A_V$ becomes parallel to the line $F_V$. The curve $B_V$ crosses the decision level $V_{COM}$ at point $P_5$ corresponding to time $T_{4b}$, which has a time lag of $T_{4b}$-$T_3$ with respect to time $T_3$ when the line $F_V$ crosses the decision level $V_{COM}$. Again, the time lag represents an error in the exposure period. A curve shown in broken lines AR corresponds to the curve $I_{AR}$ shown in FIG. 3, and is offset from the curve $A_V$ adjacent to the break point $P_1$ in the similar manner as the curve $I_{AR}$ is slightly offset from the ideal curve $I_A$.

It will be seen that the reflected light from the film surface and the first blind surface, formed by a black cloth, depends on the respective reflectivities, and accordingly the photocurrent which results from the reflected light from the film surface having an increased reflectivity is high while the photocurrent which results from the reflected light from the first blind surface having a reduced reflectivity is low. Consequently, the integrated voltages, which represent an integration of the respective photocurrents, are as shown in FIG. 4.

When the photoelectric transducer element is used for photometry which provides a curve similar to the curve $F_V$ shown in FIG. 4 or which receives reflected light from the film surface or a blind surface having an equivalent reflectivity, a proper exposure period can be correctly determined. However, when the photometry is made for the reflected light from a combination of the first blind surface, such as a black cloth, and the film surface, as would be illustrated by the curves $A_V$, $B_V$, the resulting integrated voltage is reduced as compared with that of the ideal curve $F_V$, so that a proper exposure period cannot be obtained.

To overcome this difficulty, there has been proposed to provide means which corrects an integrated voltage as typically exemplified by the curve $A_V$ or $B_V$ in order that a proper exposure period may be determined. By way of example, in Japanese Patent Application No. 27,848/1979, corresponding to U.S. Application Ser. No. 109,762, now U.S. Pat. No. 4,295,750, and West German Patent Application No. P.30 08 864.3, there is disclosed correction means in the form of a capacitor switching system which is used for a zero bias, direct integrating arrangement. In another Japanese Patent Application No. 27,847/1979, there is disclosed correction means in which the amplification factor of a variable amplification arithmetic circuit is varied in a time sharing technique to correct the integrated voltage.

However, the former arrangement suffers from the disadvantages that because a plurality of integrating and correcting capacitors are used, the implementation of the circuit into an integrated circuit is difficult to achieve, and because the circuit becomes an extensive one, a satisfactory functioning of an analog switch cannot be provided, resulting in a failure to provide a sufficient correction. The latter arrangement involves a sequential switching of a number of analog switches. This results in an increased number of inflection points as the switching takes place, thereby disadvantageously causing a hunting of the shutter at these points.

SUMMARY OF THE INVENTION

It is an object of the invention to eliminate the described disadvantages of the prior art by providing a reflection photometric apparatus for a camera including a focal plane shutter in which a black first blind surface is used without change, and the reflected light from the blind surface and a film surface is determined by a photoelectric transducer element to provide an actual integrated voltage, which is corrected by a summing amplifier circuit and a sample-and-hold circuit into a more ideal value in order to determine a proper exposure period.

In accordance with the invention, the reflected light from the first shutter blind surface and the film surface, both of which have different reflectivities, is determined to provide an integrated voltage, which is applied to a sample-and-hold circuit and stored therein. An output voltage from the sample-and-hold circuit is corrected by a reflectivity correction factor. The corrected output voltage and the integrated voltage are summed together by the summing amplifier circuit to provide a properly corrected output voltage. In this manner, an accurate exposure period can be determined even though the blind surface and the film surface have different reflectivities.

In the reflection photometric apparatus of the invention, a single holding capacitor is used as a principal element, and a single analog switch is used to provide a switching of a corrected value during the photometry operation. As a result, the implementation into an integrated circuit is possible, and the number of points of inflection is reduced.

DESCRIPTION OF PREFERRED EMBODIMENTS

Figure 5:
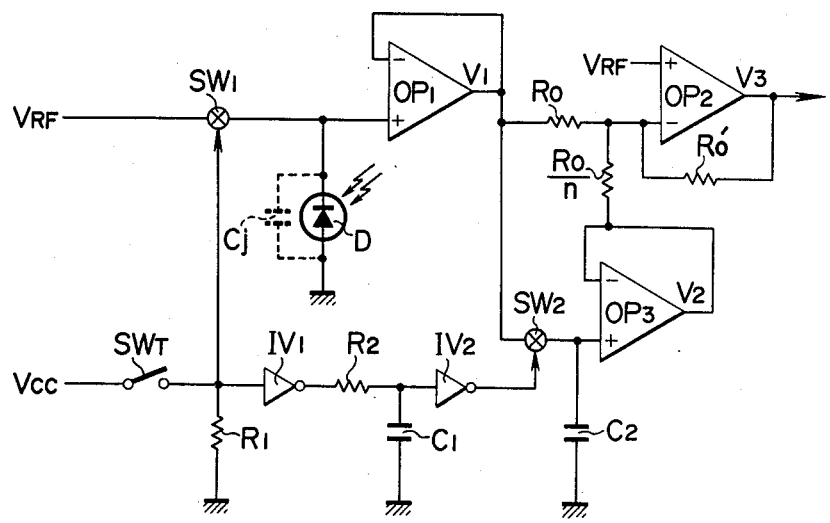
FIG. 5 is a circuit diagram of a reflection photometric apparatus for camera including a focal plane shutter according to one embodiment of the invention.

FIG. 5 shows a circuit diagram of the reflection photometric apparatus according to the invention. The apparatus includes a silicon photodiode D which determines reflected light from a first blind surface and a film surface, an operational amplifier $OP_1$ formed by a voltage follower and responsive to an integrated voltage which results from the reflected light, another operational amplifier $OP_3$ forming a sample-and-hold circuit, and a further operational amplifier $OP_2$ forming a summing amplifier circuit which sums the output voltages from the operational amplifiers $OP_1$, $OP_3$.

The operational amplifier $OP_1$ includes a non-inverting input terminal which is connected to the cathode of the silicon photodiode D, and which is also connected to receive a reference voltage $V_{RF}$ through an analog switch $SW_1$.

The silicon photodiode D represents a photoelectric transducer element which senses reflected light from a first shutter blind and a film surface of the camera. In response to the reflected light, photodiode D produces a photocurrent which depends on the magnitude of the reflected light. As shown in dotted lines in FIG. 5, the silicon photodiode D has a junction capacitance Cj across the cathode and anode thereof. Consequently, the output photocurrent from the photodiode D charges the junction capacitance Cj to develop an integrated voltage, which is applied to the non-inverting input terminal of the operational amplifier $OP_1$, which develops an integrated voltage $V_1$ at its output terminal.

The operational amplifier $OP_3$ which forms the sample-and-hold circuit includes a non-inverting input terminal which is connected to one end of a holding capacitor $C_2$ and which is also connected through an analog switch $SW_2$ to the output of the operational amplifier $OP_1$. As a consequence, the output voltage (the integrated voltage $V_1$) from the operational amplifier $OP_1$ is fed through the analog switch $SW_2$ to charge the capacitor $C_2$, whereby it is output from the operational amplifier $OP_3$ as an output voltage $V_2$.

The analog switches $SW_1$, $SW_2$ are formed by CMOS transistors, each of which includes a gate terminal as indicated by arrows in FIG. 5. When a high level signal is applied to its gate terminal, the analog switch is turned on while it is turned off in response to a low signal applied to the gate terminal. The gate terminal of the analog switch $SW_1$ is connected to ground through a resistor $R_1$ and is also connected to a supply voltage Vcc through a trigger switch $SW_T$. As a result, when the trigger switch $SW_T$ is closed, the voltage Vcc is applied to the gate terminal of the analog switch $SW_1$ to turn it on. Hence, the junction capacitance Cj of the photodiode D is charged to the reference voltage $V_{RF}$ through the analog switch $SW_1$.

The supply voltage Vcc is also applied through the trigger switch $SW_T$ to the input of an inverter $IV_1$, the output of which is connected through a resistor $R_2$ to the input of a next inverter $IV_2$, the output of which is in turn connected to the gate terminal of the analog switch $SW_2$. The input of the inverter $IV_2$ is also connected with one end of a capacitor $C_1$, the other end of which is connected to ground. The capacitor $C_1$ forms a time constant circuit together with the resistor $R_2$, and when the trigger switch $SW_T$ is closed, the inverter $IV_1$ is turned on to prevent the capacitor $C_1$ from being charged, whereby the inverter $IV_2$ remains off. As a result, inverter $IV_2$ produces a high level output signal which turns the analog switch $SW_2$ on. When the trigger switch $SW_T$ is open, the inverter $IV_1$ is immediately turned off, but the inverter $IV_2$ does not turn on until after a time delay which is determined by the time constant of the capacitor $C_1$ and resistor $R_1$. In the embodiment being described, this time interval is established to be equal to a time length from the opening of the trigger switch $SW_T$ until the first shutter blind has fully exposed the picture frame. Consequently, when the first blind has fully exposed the picture frame the inverter $IV_2$ is turned on, with its low level output signal turning the analog switch $SW_2$ off. As a result, the voltage prevailing when the first blind has fully exposed the picture frame remains charged across the holding capacitor $C_2$.

The operational amplifier $OP_2$ which forms the summing amplifier includes an inverting input terminal which is connected through a resistor $R_0$ to the output voltage $V_1$ of the operational amplifier and also connected through a resistor $R_0/n$ to the output voltage $V_2$ of the operational amplifier $OP_3$. The non-inverting input terminal of the operational amplifier $OP_2$ is supplied with the reference voltage $V_{RF}$. Another resistor $R_0'$ is connected between the inverting input terminal and the output terminal of the operational amplifier $OP_2$.

The designation of the resistor $R_0/n$ indicates that the resistor has a resistance which is equal to the resistance of the resistor $R_0$ divided by n. The resistors $R_0$ and $R_0'$ have an equal resistance. The factor n depends on the difference between the reflectivity of a standard film surface and that of a black first blind surface, and will be referred to hereafter as a reflection correction factor. Specifically, the reflection correction factor n is represented as follows:

$$n \leq \frac{\text{reflectivity of standard film surface}}{\text{reflectivity of first blind surface}} \quad (1)$$

As will be apparent, the correction factor n represents the reflectivity of the standard film surface relative to that of the first blind surface, but in practice, its value is chosen slightly less than the value of the right-hand side term of the equation (1).

As mentioned above, the operational amplifier $OP_2$ forms the summing amplifier, so that its output voltage $V_3$, is given by the following equation:

$$V_3 = (n+2)V_{RF} - (V_1 + nV_2) \quad (2)$$

In equation (2), the first right-hand term or $(n+2)V_{RF}$ is a constant since $V_{RF}$ represents the reference voltage and n the ratio of the reflectivity of the film surface to that of the first blind surface. Neglecting this term, the output voltage $V_3$ is represented by the sum of the output voltage $V_1$ of the operational amplifier $OP_1$ and n times the output voltage $V_2$ of the operational amplifier $OP_3$ or $nV_2$. This means that the term involving the output voltage $V_1$ represents the integrated voltage itself which is indicated by the curve $B_V$ shown in FIG. 4 while the term involving $nV_2$ represents a correction value which represent a difference between the curves $B_V$ and $F_V$ shown in FIG. 4. More specifically, until the first blind has fully exposed the picture frame or during the time from $T_1$ to $T_2$ in FIG. 4, the output voltage $V_2$ of the operational amplifier $OP_3$ is equal to the output voltage $V_1$ of the operational amplifier $OP_1$, or $nV_2 = nV_1$. The value $nV_1$ represents the integrated voltage $V_1$ shown by the curve $B_V$ multiplied by the reflection correction factor n, and as will be apparent from the definition of the equation (1), since the correction factor n represents the ratio of the reflectivity of the film surface to that of the first blind surface, it represents a correction for the difference between the curves $B_V$ and $F_V$. Accordingly, the correction value $nV_1$ increases in proportion to an increase in the integrated voltage $V_1$ which results from the reflected light from the first blind surface and the film surface, as will be evident from FIG. 4.

After time $T_2$ when the first blind has fully exposed picture frame, the holding capacitor $C_2$ associated with the operational amplifier $OP_3$ of the sample-and-hold circuit is prevented from charging by the analog switch $SW_2$ which is then turned off, so that the output voltage $V_2$ of the operational amplifier $OP_3$ remains equal to the voltage $V_{T2}$ which is reached at time $T_2$. Consequently, after time $T_2$, $V_2$ has a value represented as follows:

$$V_2 = V_{T2} \quad (3)$$

The substitution of the equation (3) into the equation (2) yields $$V_3 = (n+2)V_{RF} - (V_1 + nV_{T2}) \quad (4)$$

Figure 1:
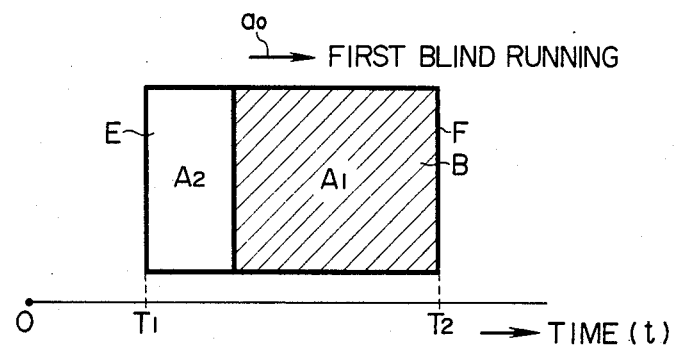
FIG. 1 is a schematic view of a picture frame illustrating the operation of a first shutter blind relative to a film surface.
Figure 2:
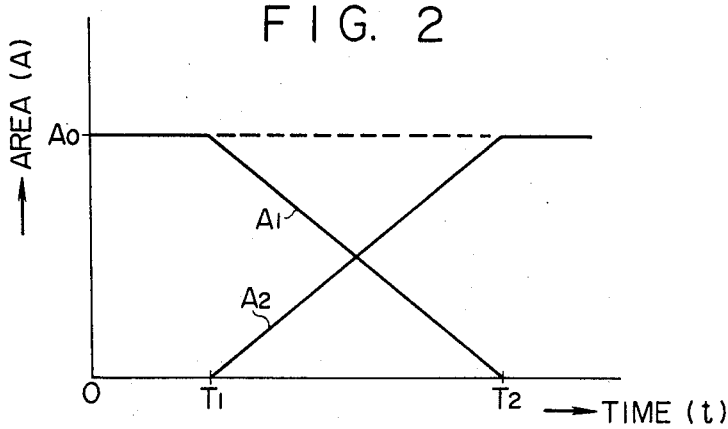
FIG. 2 graphically shows the relationship between the areas of the film surface and the blind surface.
Figure 3:
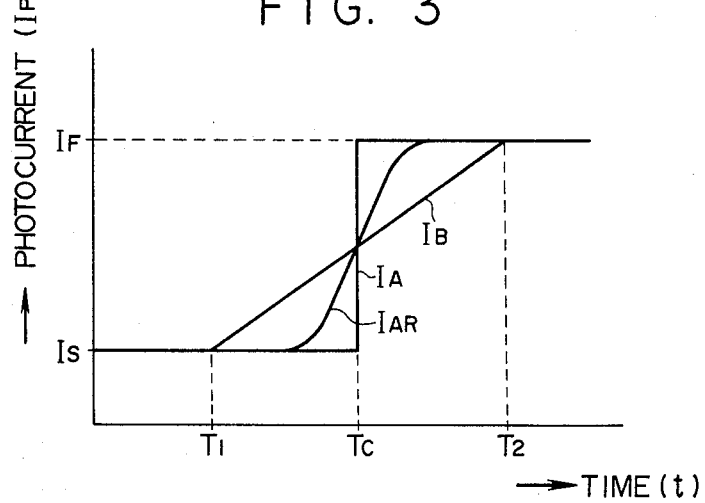
FIG. 3 graphically shows a change in the photocurrent which results from reflected light from the film surface and the blind surface.

In this equation, neglecting the first term which is constant, the output voltage $V_3$ which is produced after time $T_2$ represents the sum of the output voltage $V_1$ from the operational amplifier $OP_1$ which is shown by the curve $B_V$ and the correction value $nV_{T2}$. As will be seen from the examination of the curves $B_V$ and $F_V$ shown in FIG. 1, the difference between these curves or the correction value after time $T_2$ remains constant, which is equal to n times the voltage $V_1$ at time $T_2$ or $V_{T2}$, thus $nV_{T2}$.

Figure 4:
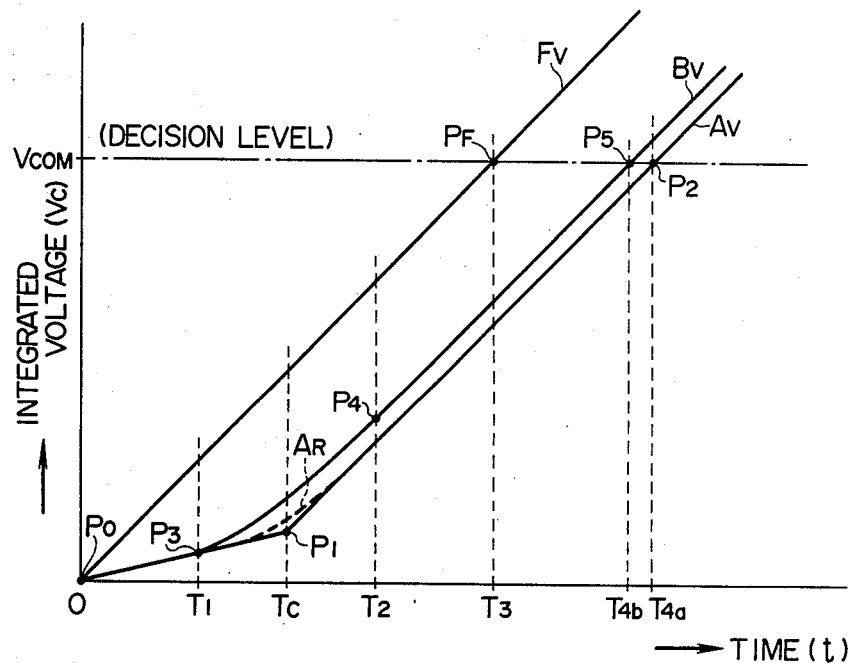
FIG. 4 graphically shows a change in the integrated voltage as the amount of reflected light from the film surface and the blind surface varies.

As discussed, the correction value which compensates for the difference between the curves $B_V$ and $F_V$ shown in FIG. 4 is the output voltage $V_1$ indicated by the curve $B_V$ during the time from $T_1$ to $T_2$ multiplied by the reflection correction factor n. In the summing amplifier circuit shown in FIG. 5, the multiplication is achieved by using the resistor having the resistance $R_0/n$ for feeding the output voltage $V_2$ of the operational amplifier $OP_3$. Since the correction value remains constant after time $T_2$, the analog switch $SW_2$ may be used to interrupt the input to the sample-and-hold circuit, thus maintaining the integrated voltage which prevails at the time. In this manner a constant correction value is obtained.

Figure 6:
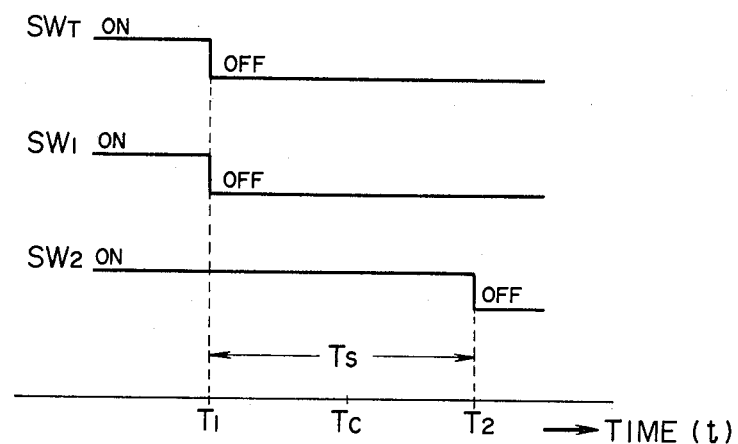
FIG. 6 is a timing chart illustrating the points in time when various switches used in the circuit of FIG. 5 are operated.

FIG. 6 shows the timing relationship between the operation of the switches $SW_T$, $SW_1$ and $SW_2$ shown in FIG. 5. Referring to FIGS. 5 and 6, the operation will now be described. Normally, the trigger switch $SW_T$ remains closed. Accordingly, the supply voltage Vcc is applied to the gate of the analog switch $SW_1$ and the input of the inverter $IV_1$ through the trigger switch $SW_T$. As a result, the analog switch $SW_1$ is turned on, allowing the junction capacitance Cj of the silicon photodiode D to be charged by the reference voltage $V_{RF}$. When the inverter $IV_1$ is turned on, the capacitor $C_1$ in the time constant circuit is not charged, and inverter $IV_2$ is turned off thereby turning the analog switch $SW_2$ on. When a shutter button of the camera is depressed under this condition, the trigger switch $SW_T$ is opened, initiating the photometry and simultaneously allowing the first blind to run. Hence, the film surface begins to be exposed. When the trigger switch $SW_T$ is open, the analog switch $SW_1$ is turned off, and the inverter $IV_1$ produces a high level output. When the analog switch $SW_1$ is turned off, the reference voltage $V_{RF}$ is no longer applied to charge the junction capacitance Cj, and the capacitance Cj is charged by a photocurrent which is produced by the silicon photodiode D in response to the reflected light from the first blind surface and the film surface. The voltage across the capacitance is applied to the non-inverting input terminal of the operational amplifier $OP_1$ as an integrated voltage, and is directly derived at the output thereof as an output voltage $V_1$.

The output voltage $V_1$ is applied through the resistor $R_0$ which forms part of the summing amplifier circuit, to the inverting input terminal of the operational amplifier $OP_2$, and is also applied through the analog switch $SW_2$ to the holding capacitor $C_2$, charging the latter to a voltage of the same magnitude. The charged voltage is derived as an output voltage $V_2$ of the operational amplifier $OP_3$. Thus, the output voltage $V_1$, the voltage across the holding capacitor $C_2$ and the output voltage $V_2$ all have the same value.

The output voltage $V_2$ of the operational amplifier $OP_3$ is applied to the inverting input terminal of the operational amplifier $OP_2$ through the other resistor $R_0/n$ of the summing amplifier circuit, whereby it is summed together with the output voltage $V_1$, also applied thereto through the resistor $R_0$, thus producing an output voltage $V_3$ from the operational amplifier $OP_2$. It will be seen that the output voltage $V_3$ has a value which is determined by the equation (2) and which has appropriately compensated for a difference in the reflectivity of the first blind surface and film surface, as reflected in a photocurrent output from the silicon photodiode D.

The high level output signal from the inverter $IV_1$ charges the timing capacitor $C_1$ through the resistor $R_2$. The time constant of the resistor $R_2$ and the capacitor $C_1$ is chosen to be equal to the time required for the first blind to fully open the picture frame, as indicated by a delay time $T_S$ in FIG. 6. Hence, at time $T_2$, sufficient voltage is charged across the capacitor $C_1$ to drive the next following inverter $IV_2$, with result that the inverter $IV_2$ produces a low level output, which in then turns the analog switch $SW_2$ off. Such timing relationship is illustrated in FIG. 6.

When the analog switch $SW_2$ is turned off at time $T_2$, the holding capacitor $C_2$ is no longer charged by the output voltage $V_1$ from the operational amplifier $OP_1$, but maintains the output voltage $V_1$ of a magnitude which prevails at time $T_2$. This magnitude is designated as the voltage $V_{T2}$. Since the analog switch $SW_2$ is turned off and the operational amplifier $OP_3$ has a high input impedance to prevent a discharge of capacitor $C_2$, the voltage $V_{T2}$ is maintained after time $T_2$ so as to be produced at the output of the operational amplifier $OP_3$ as $V_2 = V_{T2}$ and outputted through the resistor $R_0/n$ as the output voltage $V_3$ from the operational amplifier $OP_2$. It will be understood that the output voltage $V_3$ has a magnitude which is defined by the equation (4) and which has appropriately corrected the integrated voltage resulting from the silicon photodiode D after time $T_2$.

As mentioned above, the output voltage $V_3$ from the operational amplifier $OP_2$ has appropriately compensated for a difference in the reflectivity between the first shutter blind surface and the film surface, and hence enables a proper exposure period to be determined in accordance therewith. To achieve this, a voltage decision circuit may be connected to the output of the operational amplifier $OP_2$ to determine the corrected output voltage $V_3$ or a proper exposure period, thus allowing a shutter closing electromagnet to be operated to allow a second shutter blind to run. In this manner, the exposed film surface can be covered, thereby achieving a proper exposure.

Figure 7:
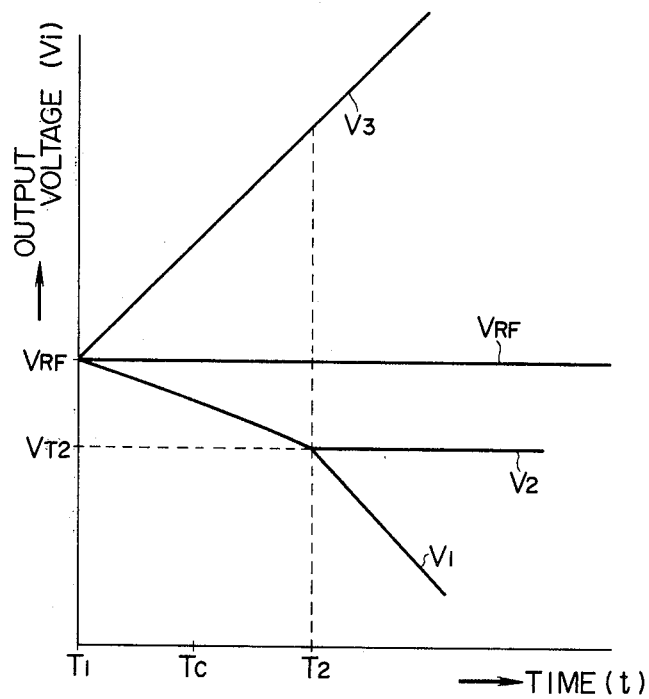
FIG. 7 graphically shows certain output voltages from the circuit of FIG. 5.

FIG. 7 graphically illustrates the various output voltages $V_1$, $V_2$ and $V_3$ against a common time axis t. The respective output voltage Vi is shown on the ordinate. The output voltage $V_1$ of the operational amplifier $OP_1$ initially has a magnitude which is equal to the reference voltage $V_{RF}$ when the circuit is initially turned on, but the magnitude decreases as the photometry is initiated at time $T_1$ to allow the photocurrent from the photodiode D to charge the junction capacitance Cj. It will be noted that the characteristic curve which represent the output voltage $V_1$ is the same as the curve $B_V$ shown in FIG. 4. The output voltage $V_2$ of the operational amplifier $OP_3$ is equal to the output voltage $V_1$ until time $T_2$ when the analog switch $SW_2$ is turned off, but thereafter maintains the prevailing voltage $V_{T2}$ at time $T_2$. As will be apparent from the equation (3), the output voltage $V_3$ of the operational amplifier $OP_2$ is equal to $V_{RF}$ when the output voltage $V_1$, $V_2$ are equal to $V_{RF}$ at time $T_1$. Since the output voltages $V_1$, $V_2$ both decrease as shown in FIG. 7 after time $T_1$, the magnitude of the output voltage $V_3$ increases gradually, as shown in FIG. 7. It will be noted that the characteristic curve of the output voltage $V_3$ is properly corrected so as to correspond to the ideal curve $F_V$ shown in FIG. 4.

In the embodiment described above, the time constant of the capacitor $C_1$ and the resistor $R_2$ has been chosen to be equal to the time from the opening of the trigger switch $SW_T$ until the first blind fully exposes the picture frame because a photoelectric transducer element having a uniform orientation characteristic is used to yield an integrated voltage according to the curve $B_V$ of FIG. 4, which is corrected at time $T_2$ in order to determine a proper exposure period.

Figure 8:
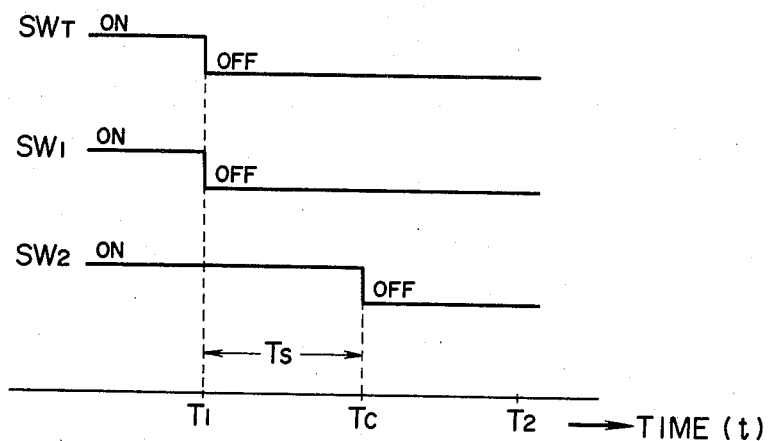
FIG. 8 is a timing chart showing the relationship between the timing of operating various switches used in the circuit of FIG. 5.

Now the use of a photoelectric transducer element having a center concentrated orientation characteristic to yield an integrated voltage which may be corrected to derive a proper exposure period will be described. In this instance, the value of the capacitor $C_1$ and the resistor $R_2$ is chosen so that the time constant defined by these elements correspond to the time required from the opening of the trigger switch $SW_T$ until the trailing edge of the first blind moves past the center of the film surface. When so constructed, the general arrangement is similar to the circuit shown in FIG. 5 except that the time constant is chosen as mentioned above and that the switch $SW_2$ of FIG. 5 is turned off at time $T_C$, as indicated in FIG. 8.

Figure 9:
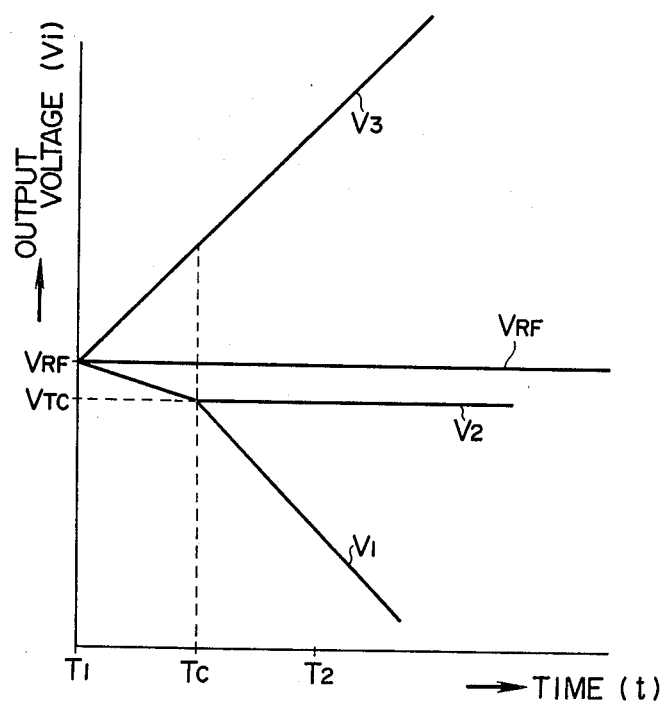
FIG. 9 graphically illustrates certain output voltages from the various parts of the circuit of FIG. 5.

FIG. 9 shows the relationship between the output voltages $V_1$, $V_2$ and $V_3$ when a photoelectric transducer element having a center concentrated orientation characteristic is used. The output voltage $V_i$ is shown on the ordinate while the abscissa represent the time t. The output voltage $V_1$ of the operational amplifier $OP_1$ assumes the value of the reference voltage $V_{RF}$ when the circuit is initially turned on, and decreases as the photometry is initiated at time $T_1$ to allow the photocurrent from the photodiode D to charge the junction capacitance $C_j$. It will be noted that the characteristic curve of the output voltage $V_1$ is identical with the curve $A_V$ shown in FIG. 4. The output voltage $V_2$ of the operational amplifier $OP_3$ remains the same as the output voltage $V_1$ until time $T_C$, when the analog switch $SW_2$ is turned off. Thereafter, it maintains the prevailing voltage $V_{TC}$. The output voltage $V_3$ of the operational amplifier $OP_2$ is equal to $V_{RF}$ when the output voltages $V_1$, $V_2$ are equal to $V_{RF}$ at time $T_1$, and thereafter increases gradually as shown in FIG. 9 since the both output voltages $V_1$, $V_2$ decrease as shown in FIG. 9. It will be noted that the characteristic curve of the output voltage $V_3$ is corrected so as to correspond to the ideal curve $F_V$ shown in FIG. 4.

An example of the output voltages $V_1$, $V_2$ and $V_3$ against time t is indicated below for the reference voltage $V_{RF}$ of 1000 mV and the correction factor n of from 5 to 7.

| t (integrating time) | $V_1$ | $V_2$ | $V_3$ |
| --- | --- | --- | --- |
| 10mS (photometry of both blind surface and film surface | 970mV | 970mV | 1180mV |
| 13.3mS (when first blind is located near the center) | 960mV | 960mV | 1240mV |
| 20mS (photometry of film surface alone) | 880mV | 960mV | 1360mV |

Thus, when a photoelectric transducer element having a center concentrated orientation characteristic is used in the reflection photometric apparatus of the invention, the integrated voltage can be approximated by two rectilinear lines, whereby the correction means is greatly simplified. In addition, a sufficient accuracy is achieved for practical purposes.

In the embodiments described above, the individual output voltages have been treated as analog quantities, but they may be processed after conversion into corresponding digital quantities.

What is claimed is:

1. In combination with a camera of the type which includes a focal plane shutter, a reflection photometric apparatus comprising:

an integrating circuit including a photoelectric transducer element for sequentially measuring light reflected from a first blind and light reflected from a film surface of a film located in said camera and for generating a photometric output signal representative of the amount of light being received at any instant by said transducer element; said integrating circuit integrating said photometric output signal to provide an integrated voltage; and a correction circuit for properly correcting said integrated voltage provided by said integrating circuit so as to compensate for a difference in reflectivity between said first blind and said film surface, said correction circuit including a sample-and-hold circuit for receiving said integrated voltage from said integrating circuit until a predetermined time after the initiation of a shutter operation and for subsequently maintaining said integrated voltage received at said predetermined time, said sample-and-hold circuit producing an output voltage which until said predetermined time is equal to said integrated voltage which said sample-and-hold circuit is receiving and which output voltage is thereafter equal to said integrated voltage at said predetermined time, and a summing amplifier circuit for summing said output voltage with said integrated voltage in a manner which provides a corrected integrated voltage which has compensated for a difference in reflectivity between said first blind and said film surface.

2. The combination according to claim 1 in which said sample-and-hold circuit comprises a capacitor for holding said integrated voltage received from said integrating circuit, an operational amplifier connected to said capacitor for providing an output voltage equal to said integrated voltage across said capacitor, a switch for controlling the supply of the integrated voltage to said capacitor, and a timing circuit for turning on and off said switch.

3. In combination with a camera of the type which includes a focal plane shutter, a reflection photometric apparatus comprising:

an integrating circuit including a photometric transducer element for sequentially measuring light reflected from a first blind of said shutter and a film surface of a film located in said camera and for generating a photometric output signal as a function of the amount of light being received at any instant by said transducer element; said integrating circuit integrating said photometric output signal from said transducer element to provide an integrated voltage; and a correction circuit for properly correcting said integrated voltage provided by said integrating circuit so as to compensate for a difference in the reflectivity between said first blind and said film surface, said correction circuit including a sample-and-hold circuit for receiving said integrated voltage from said integrating circuit until a time when said first blind has fully uncovered said film surface and for subsequently maintaining said integrated voltage received at said time, said sample-and-hold circuit producing an output voltage which until said time is equal to said integrated voltage which said sample-and-hold circuit is receiving and which output voltage is thereafter equal to said integrated voltage at said time, and a summing amplifier circuit for summing said output voltage together with said integrated voltage in a manner which provides a corrected integrated voltage which has been compensated for a difference in reflectivity between said first blind and said film surface.

4. The combination according to claim 3 in which said sample-and-hold circuit comprises a capacitor for holding said integrated voltage received from said integrating circuit, an operational amplifier for providing an output voltage equal to the integrated voltage across said capacitor, a switch for controlling the supply of said integrated voltage to said capacitor, and a timing circuit for turning on and off said switch.

5. The combination of claim 4 in which said timing circuit operates said switch at a time after the initiation of running of said first blind when the trailing end of said first blind moves past the center of said film surface.

6. In combination with a camera of the type which includes a focal plane shutter, a reflection photometric apparatus comprising:

an integrating circuit including a photoelectric transducer element for sequentially measuring light reflected from a first blind of said shutter and light reflected from a film surface of a film located in said camera and for generating a photometric output signal as a function of the amount of light being received at any instant by said transducer element; said integrating circuit integrating said photometric output signal from said transducer element to provide an integrated voltage; and a correction circuit for properly correcting said integrated voltage provided by said integrating circuit so as to compensate for a difference in the reflectivity between said first blind and said film surface, said correction circuit including a sample-and-hold circuit for receiving said integrated voltage from said integrating circuit until a time when the trailing end of said first blind has moved past the approximate center of said film surface and for subsequently maintaining said integrated voltage received at said time, said sample-and-hold circuit producing an output voltage which until said time is equal to said integrated voltage which said sample-and-hold circuit is receiving and which output voltage is thereafter equal to said integrated voltage at said time, and a summing amplifier circuit for summing said output voltage together with said integrated voltage in a manner which provides a corrected integrated voltage which has compensated for a difference in the reflectivity between said first blind and said film surface.

7. The combination according to claim 3 in which said sample-and-hold circuit comprises a capacitor for holding said integrated voltage, an operational amplifier for providing an output voltage equal to said integrated voltage across said capacitor, a switch for controlling the supply of said integrated voltage to said capacitor, and a timing circuit for turning on and off said switch.

8. The combination according to claim 7 in which said timing circuit operates said switch at a time after the initiation of running of said first blind when said first blind has fully exposed said film surface.

9. The combination according to claim 1, 3 or 6 in which said summing amplifier circuit sums said integrated voltage from said integrating circuit together with said output voltage from said sample-and-hold circuit in a manner determined by a reflection correction factor representing the ratio of the reflectivity of a predetermined standard film surface to the reflectivity of said blind.

10. The combination according to claim 9 in which said summing amplifier circuit comprises an operational amplifier.

11. The combination of any one of claims 1, 3 or 6 in which said photoelectric transducer element has an internal capacitance for integrating said photometric output signal to provide said integrated voltage.

12. The combination of a camera having a focal plane shutter and a photometric apparatus, said focal plane shutter including a first blind which runs across the focal plane of said camera and thereby exposes a film located at said focal plane of said camera in response to the initiation of a shutter release operation, said photometric apparatus comprising:

(A) an integrating circuit including a photoelectric transducer element for sequentially measuring light reflected off a reflecting surface of said first blind and a film surface of said film located at said focal plane and for generating a photometric output signal indicative thereof, said integrating circuit integrating said photometric output signal so as to generate an integrated voltage; and (B) a correction circuit for correcting said integrated voltage so as to compensate for a difference in the reflectivity of said first blind surface and said film surface, said correction circuit comprising:

(1) a sample-and-hold circuit for generating a sample-and-hold voltage indicative of the value of said integrated voltage a predetermined time period after the initiation of the running of said first blind; and (2) a summing amplifier circuit for summing said integrated voltage and said sample-and-hold voltage in a manner which compensates for differences between the reflectivity of said first blind surface and said film surface.

13. A combination according to claim 12, wherein said predetermined time period equals the time it takes for said first blind to fully uncover said film surface.

14. A combination according to claim 12, wherein said predetermined time period equals the time it takes for said first blind to uncover approximately one-half of said film surface.

15. A combination according to any one of claims 12, 13 or 14, wherein said sample-and-hold circuit comprises:

a capacitor;

switch means for applying said integrated voltage to said capacitor during said predetermined time period and for terminating the application of said integrated voltage to said capacitor at the end of said predetermined time period; and an amplifier for cooperating with said switch means to permit said capacitor to maintain said integrated voltage after the termination of said predetermined time period and for providing an output voltage corresponding to said integrated voltage.

16. The combination according to claim 15, wherein said switch means includes an electronic switch and a timing circuit for controlling the operation of said electronic switch.

17. The combination according to claim 16, wherein said timing circuit includes an R-C circuit whose time constant equals said predetermined time period.

* * * * *